United States Patent
Nielsen

[11] Patent Number: 6,131,062
[45] Date of Patent: Oct. 10, 2000

[54] APPARATUS AND METHOD FOR PREVENTING AN AUTOMATIC OPERATION SEQUENCE IN A WORK VEHICLE

[75] Inventor: Bradley Nielsen, Lisle, Ill.

[73] Assignee: Case Corporation, Racine, Wis.

[21] Appl. No.: 09/234,952

[22] Filed: Jan. 21, 1999

[51] Int. Cl.[7] .............................. G06F 7/70; G06F 19/00
[52] U.S. Cl. .............................. 701/50; 701/29; 701/34; 172/2; 172/9; 37/348
[58] Field of Search .................................. 701/29, 34, 39, 701/45, 49, 50, 63; 172/4.5, 2, 9; 37/347, 348

[56] References Cited

U.S. PATENT DOCUMENTS

| | | |
|---|---|---|
| 4,271,402 | 6/1981 | Kastura et al. . |
| 4,277,772 | 7/1981 | Kastura et al. . |
| 4,715,012 | 12/1987 | Mueller, Jr. . |
| 4,736,367 | 4/1988 | Wroblewski et al. . |
| 4,804,937 | 2/1989 | Barbiaux et al. . |
| 4,807,161 | 2/1989 | Comfort et al. . |
| 4,809,177 | 2/1989 | Windle et al. . |
| 4,819,184 | 4/1989 | Jönsson et al. . |
| 4,843,557 | 6/1989 | Ina et al. . |
| 4,899,338 | 2/1990 | Wroblewski . |
| 5,369,584 | 11/1994 | Kajiwara . |
| 5,481,906 | 1/1996 | Nagayoshi et al. . |
| 5,534,848 | 7/1996 | Steele et al. . |
| 5,557,510 | 9/1996 | McIntrye et al. .......................... 701/50 |
| 5,557,526 | 9/1996 | Anderson .................................. 701/50 |
| 5,579,227 | 11/1996 | Simmons, Jr. et al. . |
| 5,590,040 | 12/1996 | Abe et al. . |
| 5,806,805 | 9/1998 | Elbert et al. ............................. 244/195 |
| 6,058,342 | 5/2000 | Orbach et al. ............................ 701/50 |
| 6,070,539 | 6/2000 | Flamme et al. ........................... 701/50 |

Primary Examiner—William A. Cuchlinski, Jr.
Assistant Examiner—Gertrude Arthur
Attorney, Agent, or Firm—Foley & Lardner

[57] ABSTRACT

An apparatus and method is disclosed for preventing the performance of an automatic sequence of operations of a work vehicle. The apparatus is a system that includes a databus, a plurality of input devices, a primary control unit coupled to the plurality of input devices and to the databus, a plurality of output devices and a plurality of secondary control units coupled to the databus, each of the secondary control units also being coupled to at least one of the output devices. The primary control unit directs the performance of the automatic sequence of operations by generating commands to be provided onto the databus. Each of the secondary control units directs an output function by the at least one output device coupled thereto in response to the commands on the databus. At least one of the secondary control units provides a status signal onto the databus indicative of a status of the at least one of the secondary control units or the respective output device, wherein the primary control unit prevents the performance of the automatic sequence of operations if the status signal is indicative of a system malfunction.

24 Claims, 6 Drawing Sheets

FIG. 3     END-OF-ROW MACRO

| | |
|---|---|
| 305 | START [TRACTOR REACHES END OF ROW] |
| 310 | ELECTRONIC DRAFT CONTROL UNIT RAISES HITCH / IMPLEMENT |
| | PTO CONTROL UNIT : |
| 315 | A. UNLOCKS DIFFERENTIAL LOCKING MECHANISM |
| 320 | B. DISENGAGES POWER TAKE-OFF |
| 325 | C. DISENGAGES MECHANICAL FRONT-WHEEL DRIVE |
| 330 | ENGINE GOVERNOR CONTROL UNIT LOWERS THROTTLE SETTING |
| 335 | TRANSMISSION CONTROL UNIT SHIFTS TRANSMISSION SETTING |
| 340 | STEERING CONTROL UNIT CAUSES TRACTOR TO TURN |
| 345 | TRANSMISSION CONTROL UNIT SHIFTS TRANSMISSION SETTING |
| 350 | ENGINE GOVERNOR CONTROL UNIT INCREASES THROTTLE SETTING |
| | PTO CONTROL UNIT : |
| 355 | A. ENGAGES MECHANICAL FRONT-WHEEL DRIVE |
| 360 | B. LOCKS DIFFERENTIAL LOCKING MECHANISM |
| 365 | ELECTRONIC DRAFT CONTROL UNIT LOWERS HITCH / IMPLEMENT |
| 370 | END [TRACTOR BEGINS NEW ROW] |

FIG. 4     BACKHOE MACRO

| | |
|---|---|
| 405 | START (BACKHOE BEGINS DIGGING) |
| 410 | LOWER BOOM ASSEMBLY TO HOLE |
| 415 | RETRACT BUCKET TO SCOOP OUT MATERIAL |
| 420 | RAISE BOOM ASSEMBLY TO LIFT OUT MATERIAL |
| 425 | REPOSITION BOOM ASSEMBLY ABOVE HAULING (DUMP) TRUCK |
| 430 | EXTEND BUCKET TO DROP MATERIAL INTO TRUCK |
| 435 | REPOSITION BOOM ASSEMBLY ABOVE HOLE |
| 440 | END (BACKHOE FINISHES DIGGING) |

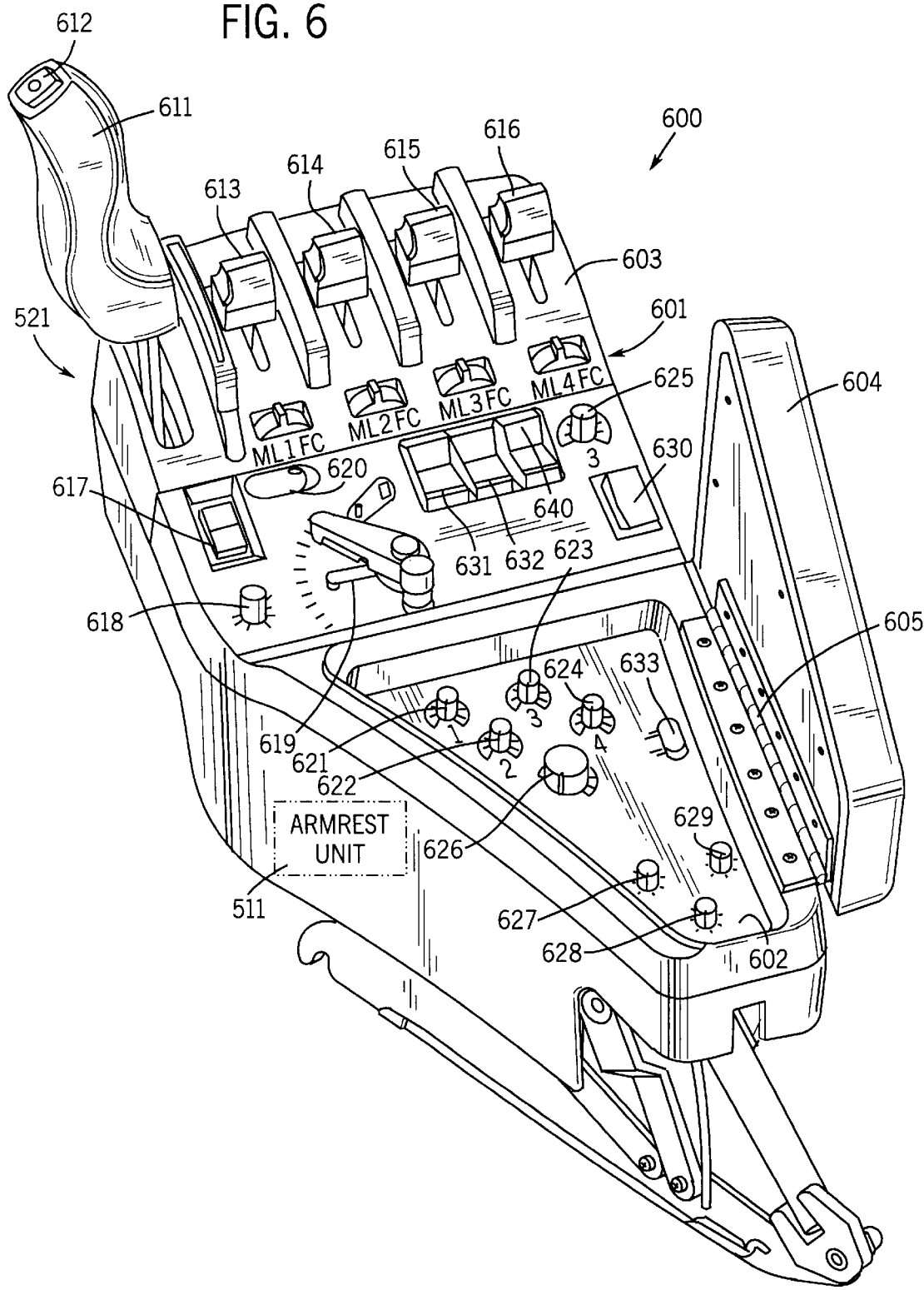

APPARATUS AND METHOD FOR PREVENTING AN AUTOMATIC OPERATION SEQUENCE IN A WORK VEHICLE

FIELD OF THE INVENTION

The present invention relates to an apparatus and method for preventing an automatic operation sequence in a work vehicle. More particularly, the present invention relates to an apparatus and a method in which a first control unit that is controlling the performance of an automatic operation sequence of a work vehicle terminates or inhibits the performance of that automatic operation sequence in response to a status signal associated with a second control unit and provided to the first control unit via a databus.

BACKGROUND OF THE INVENTION

Work vehicles (including, but not limited to, agricultural work vehicles such as tractors and combines as well as construction equipment vehicles such as loader-backhoes) can be configured to automatically perform sequences of operations. Such automatic sequences of operations (also known as "macros") facilitate the operation of the work vehicles by their operators. The macro allows the operator of a work vehicle to command multiple functions simultaneously or in rapid succession by actuating a single input device. In the absence of such an automatic sequence of operations, the operator would be required to manually activate and/or control each of the multiple functions. This activation and/or control of multiple functions within a short time by the operator may require a high level of skill or concentration, may lead to increased operator fatigue or, in some cases, may not be possible. Yet through the implementation of an automatic sequence of operations, the operator of the work vehicle can cause many functions to take place at the "push of a button" (or at some point following the push of a button) with minimal effort or concentration on the operator's part.

Such automatic sequences of operations are useful in many contexts. For example, an agricultural tractor is often required to perform multiple operations repeatedly at the end of each row of a field as the tractor traverses the field. These functions may include (a) raising or lowering a hitch, or an implement being towed by the tractor, (b) raising or lowering one or more field markers associated with the tractor, (c) disabling or enabling a power take-off shaft providing power to a towed implement, (d) deactivating or activating the distribution of seeds, insecticide or other farming input being applied to the field, (e) disengaging or engaging a mechanical four-wheel drive ("MFD") mechanism or a differential locking ("DL") mechanism, (f) decreasing or increasing the setting of the engine throttle, (g) shifting the gear ratio between the input and output of a transmission of the tractor and (h) activating or deactivating an automatic steering routine. Given the number and complexity of these operations at the end of a row, an automatic performance of some or all of these operations can facilitate the operation of the work vehicle by its operator and reduce the likelihood of operator error.

In the construction equipment vehicle field, a loader-backhoe, for example, may be required to perform the same or similar movements repeatedly as the loader-backhoe excavates a hole. These movements may include (a) lowering a boom assembly of the loader-backhoe from a raised position above a hole into the hole, (b) retracting a bucket of the boom assembly so that the bucket scoops up soil or other material, (c) raising the boom assembly to a raised position again, (d) repositioning the boom assembly so that the bucket is positioned over a hauling (dump) truck, (e) extending the bucket so that the material in the bucket is dropped into the hauling truck and (f) repositioning the boom assembly so that it is positioned over the hole. Controlling these movements requires significant concentration on the part of the operator of the loader-backhoe and, except in the case of a highly skilled operator, may be very time-consuming. An automatically-performed sequence of operations in this context facilitates the operation of the loader-backhoe by its operator. By automating such operations, the speed of the process of excavating a hole and placing the excavated material into a hauling truck can be increased considerably.

Implementation of such automatic sequences of operations on a work vehicle requires sophisticated electronic control mechanisms. Such electronic control mechanisms typically employ one or more electronic control units connected with one another and/or with controlled devices, input devices, communications devices, sensors, feedback mechanisms and other elements by way of databuses or other communication links.

Despite the efficacy of automatically performing sequences of operations, there are situations in which these automatic sequences should be terminated. In particular, these sequences should be terminated when either (a) the external circumstances in which the work vehicle is operating change to such an extent that the operations being performed are no longer appropriate or (b) one or more components of the work vehicle itself malfunction such that the automatic sequences would not produce the desired results if continued. For these situations, the work vehicle should include a mechanism whereby these automatic sequences are discontinued.

Work vehicles capable of such automatic sequences of operations may include a manual override feature whereby the operator may stop the automatic sequences by, for example, pressing a manual override switch. However, this type of feature is only of limited use in assuring that automatic sequences are stopped under the situations mentioned above. The operator of a work vehicle may not always observe, or even be capable of observing, whether external circumstances have changed to such an extent that a given automatic sequence of operations is inappropriate. Moreover, the operator of a work vehicle is even less likely to observe (or to be capable of observing) that particular components of the vehicle itself are malfunctioning while automatic sequences of operations are taking place. This is true not only with respect to malfunctioning electrical components of the work vehicle, but also with respect to mechanical elements, which may be deeply embedded within the work vehicle.

Accordingly, it would be advantageous to develop a system for automatically performing a sequence of operations in a work vehicle that includes an apparatus for automatically terminating the automatic sequence without manual input from the vehicle operator. It would also be advantageous if this apparatus were capable of stopping automatic sequences in response to a variety of conditions as determined by sensors and other devices, where such conditions would include the operational status of a variety of internal components. It would further be advantageous if this apparatus were easily modifiable so that the apparatus could be made responsive to additional conditions relating to devices added to the work vehicle, at a later date.

SUMMARY OF THE INVENTION

The present invention relates to a system for performing an automatic sequence of operations of a work vehicle. The system includes a databus, input devices, a primary control unit coupled to the input devices and to the databus, output devices, and secondary control units coupled to the databus, each of the secondary control units being coupled to at least one of the output devices. The primary control unit directs the performance of the automatic sequence of operations by generating commands to be provided onto the databus. Each of the secondary control units directs an output function by the at least one output device coupled thereto in response to the commands on the databus. At least one of the secondary control units provides a status signal onto the databus indicative of a status of the at least one of the secondary control units or the respective output device, and the primary control unit prevents the performance of the automatic sequence of operations if the status signal is indicative of a system malfunction.

The present invention further relates to a method of performing an automatic sequence of operations of a work vehicle. The method includes, at a primary control unit coupled to a databus, providing commands onto the databus to direct the performance of the automatic sequence of operations and, at a secondary control unit coupled to the databus, directing an output function by an output device in response to the commands on the databus and providing a status signal onto the databus indicative of a status of a system element and, at the primary control unit, preventing the performance of the automatic sequence of operations if the status signal is indicative of a system malfunction.

BRIEF DESCRIPTION OF THE DRAWINGS

FIG. 3 is a table containing an exemplary sequence of operations to be automatically performed by agricultural work vehicle at an end of a row of a field.

FIG. 4 is a table containing an exemplary sequence of operations to be automatically performed by a construction equipment vehicle while excavating a hole.

FIG. 6 is a top perspective view of an armrest control console assembly.

DETAILED DESCRIPTION OF THE PREFERRED EMBODIMENTS

Figure 1:
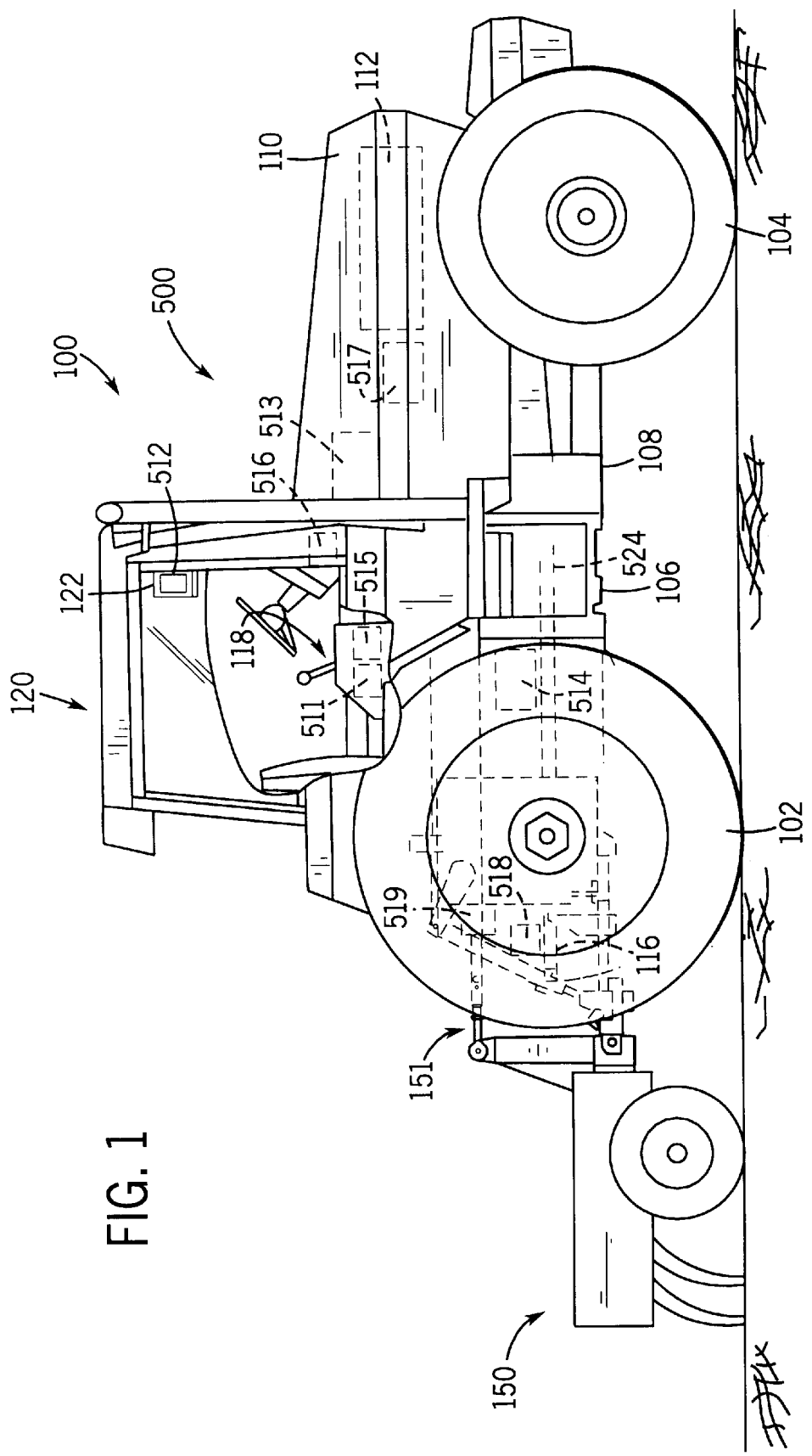
FIG. 1 is a side elevation view of an work vehicle towing an implement.

Turning now to FIG. 1, a tractor 100 is shown, representative of agricultural work vehicles such as the Case Corp. 8950 MAGNUM tractor. Tractor 100 has rear wheels 102, front wheels 104, a tractor frame 106 and a chassis 108. Tractor 100 also has an engine compartment 110 containing an engine or power plant 112 that powers various drive train elements such as a power-take-off ("PTO") shaft 116 via a transmission 524 and a hydraulic system (not shown). Tractor 100 further has an operator cab 120, provided with a variety of instruments and controls. Among these instruments and controls is an interface shown as a touch-sensitive video monitor or "touch screen" 122 capable of obtaining input signals from the operator and displaying visual information to the operator. Also provided in cab 120 is an auxiliary hydraulic controller 118 for controlling operation of the hydraulic system (not shown).

Tractor 100 includes a three-point hitch 151 which can be coupled to an implement, shown in FIG. 1 as ripper 150 (such as a Case Corp. 6810 Ripper). According to alternative embodiments, tractor 100 could tow one of a variety of other implements used to perform one or more functions upon a field, including but not limited to planters, sprayers, air drills, conventional drills, disk harrows and chisel plows, such as the Case Corp. 955 Early Riser Cyclo Air planter, 3000 TS Sprayer, 3503 Air Drill, 5500 Conventional Drill, 3950 Tandem Disk Harrow and 5800 Mulch-Till Chisel Plow, respectively (not shown). According to alternative embodiments, the implement may be coupled to tractor 100 by other mechanisms such as a draw bar (not shown).

As shown in FIG. 1 (and in greater detail in FIG. 5), tractor 100 further comprises an electronic control system 500 which includes a databus 501 for communicating information between elements of the electronic control system. Exemplary databuses include those conforming to SAE J-1939 "Recommended Practice for a Serial Control and Communications Vehicle Network" and Controller Area Network (CAN). Among the elements connected to communications databus 501 are nine electronic control units: an armrest unit ("ARU") 511, an instrument cluster unit ("ICU") 512, a performance monitor unit ("PMU") 513, a transmission control unit ("TCU") 514, an auxiliary valve control unit ("AVCU") 515, a steering control unit ("STCU") 516, an engine governor control unit ("GOV") 517, an electronic draft control unit ("EDCU") 518, and a PTO/MFD/DL control unit 519 (wherein "PTO" is power take-off, "MFD" is mechanical front-wheel drive and "DL" is differential locking). Each of these control units is capable of performing specific functions in conjunction with particular devices connected to it (as described below with respect to FIG. 5). Alternatively, other communications devices may be implemented between elements of electronic control system 500, such as direct, private communication links between pairs of elements.

Figure 1A:
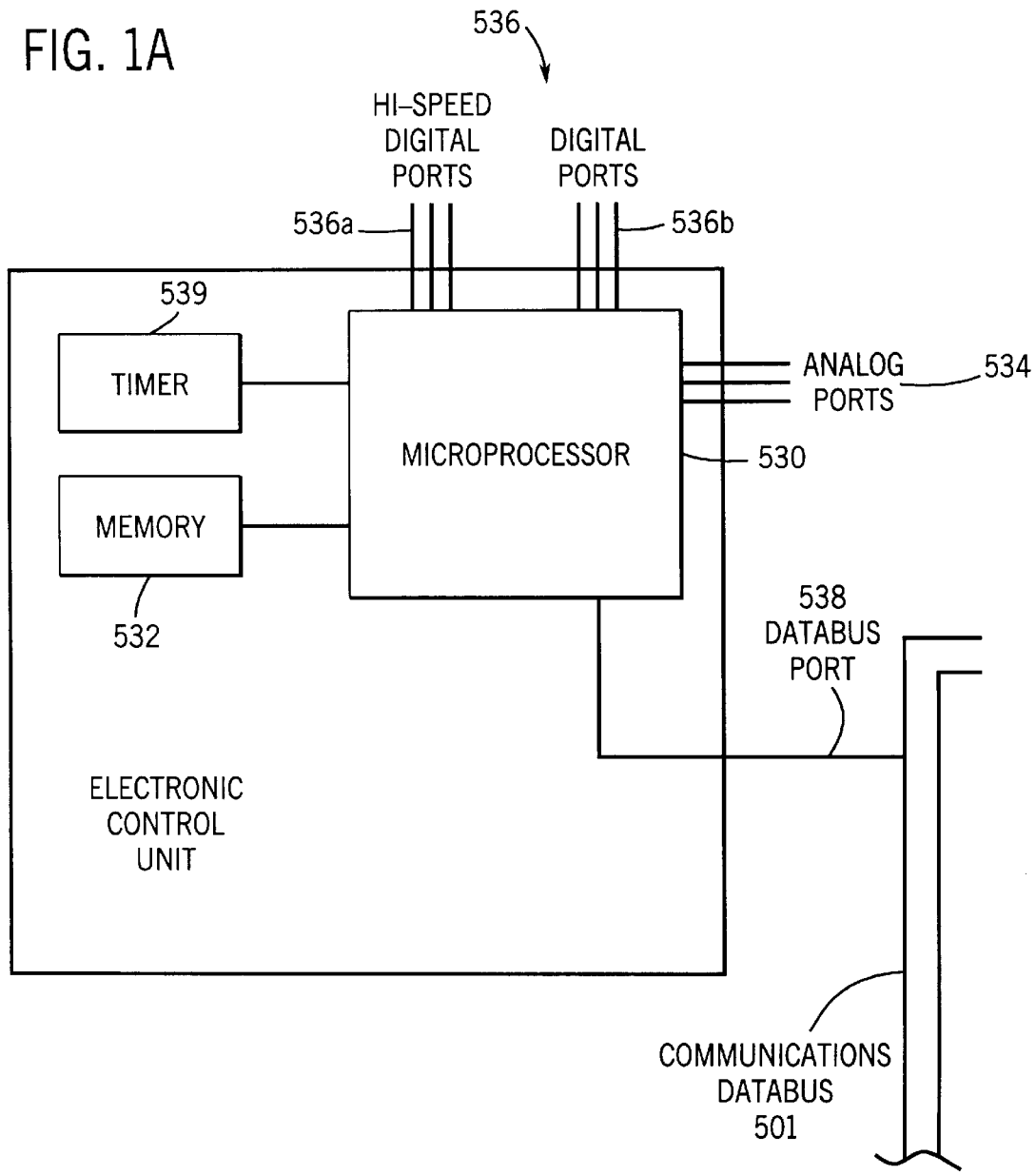
FIG. 1A is a block diagram showing internal elements of an electronic control unit connected to a communications databus.

As shown in FIG. 1A, each of electronic control units 511–519 may have in common particular internal components. Such components may include a processing device such as a microprocessor 530 and a memory 532. In one embodiment, the electronic control units are "programmable" with control programs and information in the form of configuration tables (not shown) stored in memory 532. Such control programs and configuration tables may be used by the electronic control units to determine various parameters, such as timing delays. Microprocessor 530 also may include one or more analog input-output ports 534 and digital input-output ports 536, such as high-speed digital ports 536a and standard digital ports 536b, for receiving and transmitting information. Furthermore, microprocessor 530 may include one or more databus ports 538. Electronic control units 511–519 also may include a timer 539, which may exist (as depicted) as a separate circuit element of the electronic control unit in communication with microprocessor 530 or as a part of the microprocessor (for example, as a subroutine). According to alternative embodiments, timer 539 may also exist as an element separate from but in communication with the electronic control unit. Further, according to alternative embodiments, the electronic control units may differ in structure by using, for example, dedicated, hardwired logic circuits.

Figure 2:
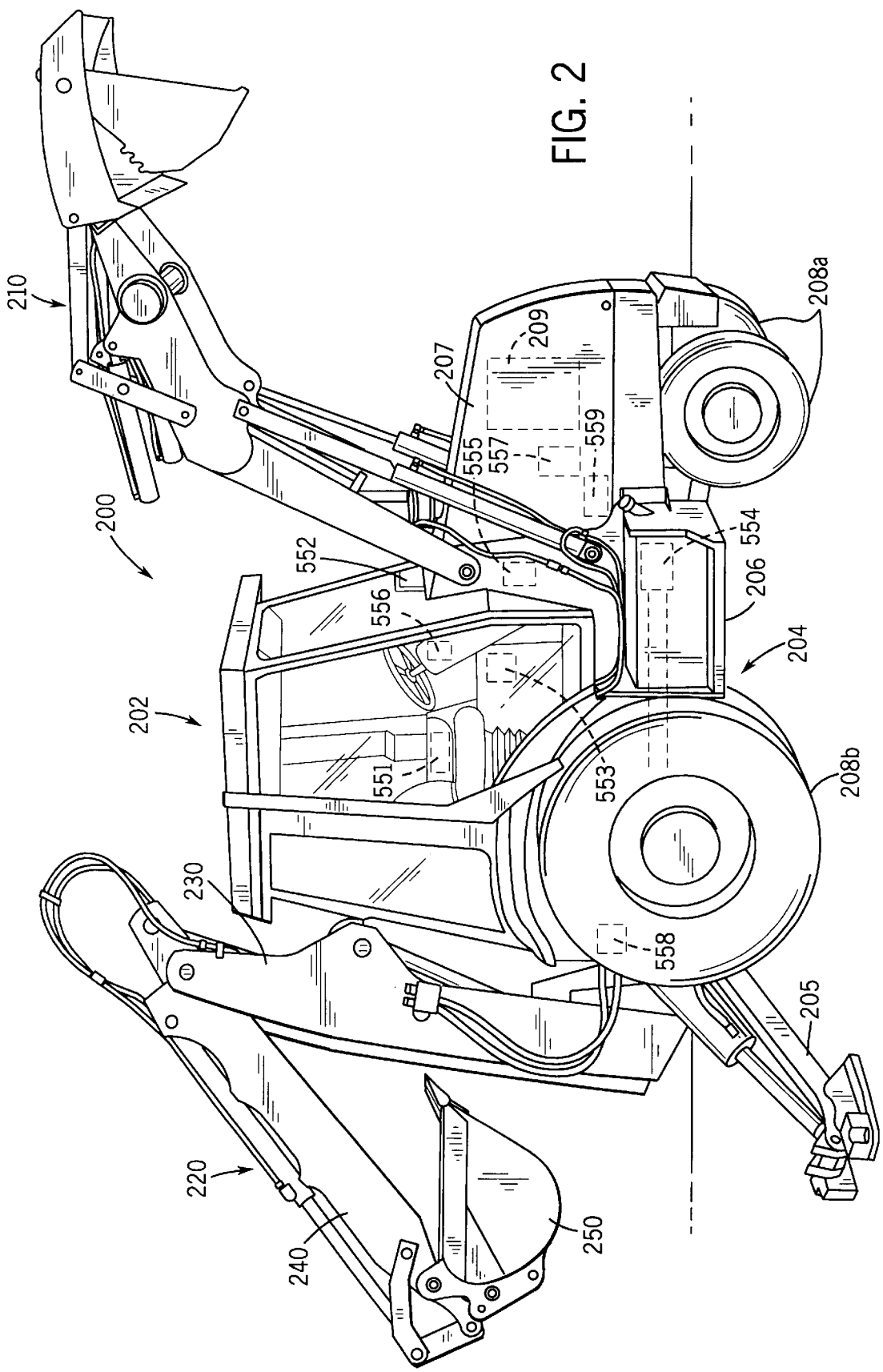
FIG. 2 is a side elevation view of a construction equipment vehicle.

Turning now to FIG. 2, a loader-backhoe 200 is shown, representative of construction equipment vehicles such as the Case Corp. 580L, 580 Super L and 590 Super L Loader/Backhoes. Loader-backhoe 200 has an operator cab 202 provided with a variety of instruments and operator controls mounted on a base 204, and a chassis 206 having front wheels 208a and rear wheels 208b. Stabilizing arms 205 (one is shown) are extendable from the sides of loader-backhoe 200 adjacent each of rear wheels 208b and may provide enhanced support and stability as excavation is performed by the loader-backhoe. Also mounted on base 204 is an engine or power plant 209 which powers various drive train and hydraulic system elements (not shown), and which is located within an enclosed compartment 207. Further, loader-backhoe 200 includes a loader assembly 210, which is located at the front end of the loader-backhoe in proximity to enclosed compartment 207.

Loader-backhoe 200 also includes a boom assembly 220 pivotally mounted to base 204 of the vehicle at a swing tower (through a pin and clevis arrangement) providing for selective rotation of the boom assembly (in a generally horizontal plane) with respect to the base of the loader-backhoe about a generally vertical pivot axis. Pivotal rotation of boom assembly 220 about the axis is achieved through a pair of actuating hydraulic swing cylinders (not shown). Boom assembly 220 includes three manipulable segments which may be arranged and controlled to operate cooperatively, as implemented in the Case Corp. 580L, 580 Super L and 590 Super L Loader/Backhoes. These segments include a boom 230, a dipper 240 and a bucket 250, each pivotally coupled in an arrangement to allow selective rotation of one segment with respect to another (or with respect to base 204) about a generally horizontal pivot axis. Through coordinated articulation of each of these segments by the operator, boom assembly 220 can be productively employed in such tasks as excavation.

Figure 5:
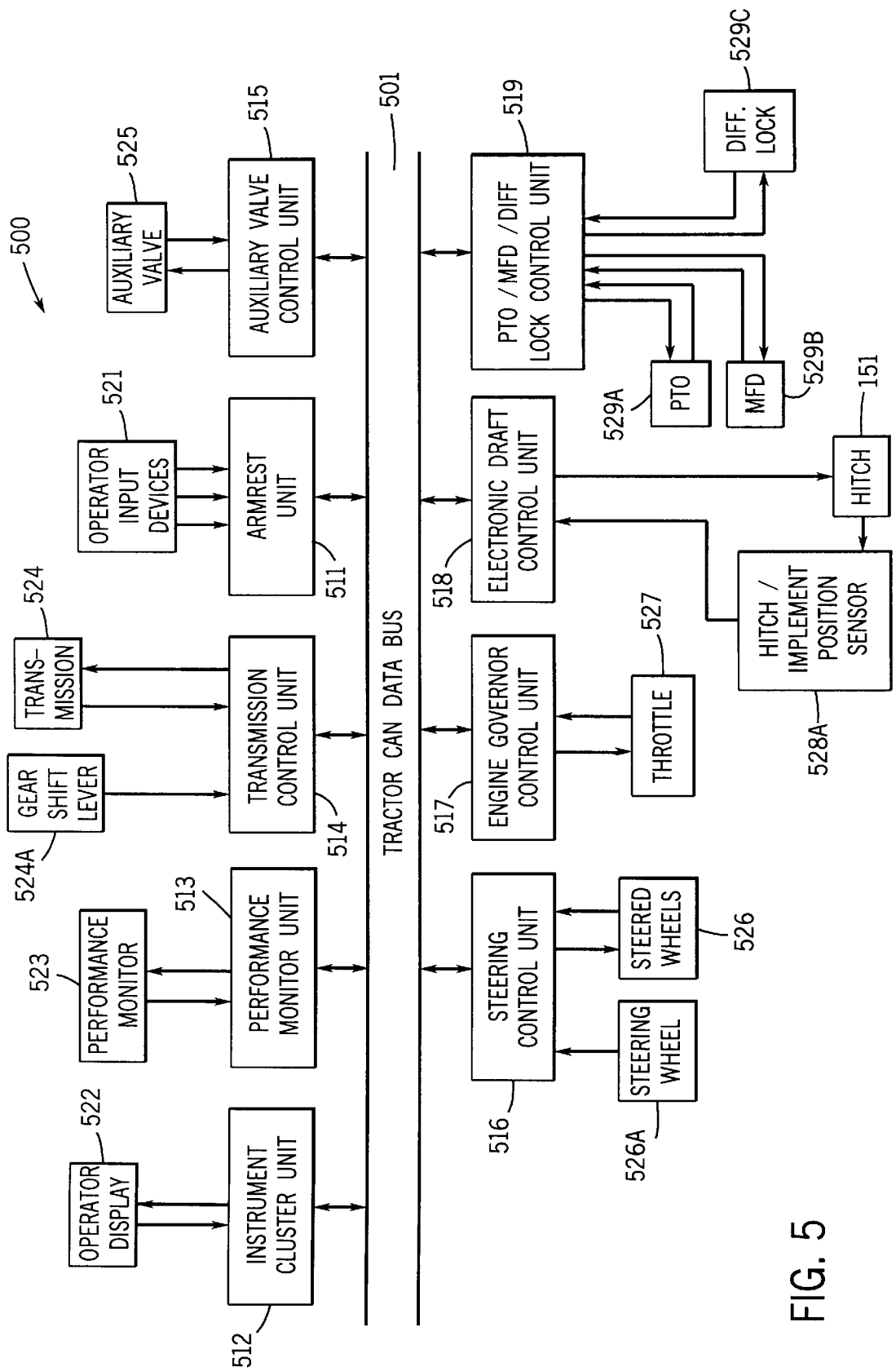
FIG. 5 is a block diagram containing elements of an exemplary apparatus for terminating an automatic sequence of operations for an agricultural work vehicle.

Similar to tractor 100, loader-backhoe 200 further comprises an electronic control system, elements of which are shown in FIG. 2. The electronic control system may include an armrest unit 551, an instrument cluster unit 552, a performance monitor unit 553, a transmission control unit 554, a loader assembly control unit 555, a steering control unit 556, an engine governor control unit 557, a boom assembly control unit 558, and a MFD/DL control unit 559. Each of these control units is capable of performing specific functions in conjunction with particular devices connected to it (as described below with respect to FIG. 5). Also, each of electronic control units 551–559 may have in common the particular internal components shown in FIG. 1A and may be interconnected with one another by way of a communications databus, as shown in FIG. 5 (although, according to alternative embodiments, the electronic control units may differ in structure or communicate with one another via structures other than a databus).

Referring to FIG. 3, a table shows an exemplary sequence of operations to be automatically performed by tractor 100 at the end of each row of a field as the tractor turns around to begin the next row. As shown, after reaching the end of a row in step 305, EDCU 518 first raises the hitch or implement in step 310. This is typically necessary for preventing the hitch or implement from acting upon (or damaging) the headland as tractor 100 turns around at the end of the row (or, in the case of markers, necessary for preventing possible damage to the markers during the turning procedure).

Next, in step 315, PTO/MFD/DL control unit 519 disengages the DL mechanism. The DL mechanism is typically engaged to increase traction of tractor 100 with respect to the ground and to decrease slippage of the tractor's wheels, but must be disengaged at the end of a row because, as the tractor turns, the wheels on opposite sides of the tractor must turn at different rates. In steps 320 and 325 respectively, the PTO shaft and MFD mechanisms are likewise disengaged. This is appropriate because, with respect to the PTO shaft, the hitch or implement does not require power while it is in the raised position and, with respect to the MFD, tractor 100 typically does not require the increased traction provided by the MFD while the hitch or implement is in the raised position (and consequently is not providing drag). Further, at steps 330 and 335, GOV 517 lowers the throttle setting to lower the speed and power of engine 112 and TCU 514 shifts transmission 524 to a lower gear ratio. These operations reduce the speed of tractor 100 as the tractor is turning around at the end of the row.

In addition to the above operations, it is also possible that tractor 100 may automatically perform the steering operation to turn itself around at the end of the row, as shown in step 340. While typically the operator of tractor 100 would be required to perform this function, under special, controlled circumstances (such as circumstances where rows are clearly marked with markers that the tractor can sense) STCU 516 may execute the steering operation without the immediate control of the operator. Further, as tractor 100 completes its turning at the end of the row and nears the start of the subsequent row (step 370), these automatic operations are largely reversed. Therefore, as shown in FIG. 3 in steps 345, 350, 355, 360 and 365, the operations performed in steps 335, 330, 325, 315 and 310 are, respectively, reversed (that is, transmission 524 is shifted to a higher gear ratio, the throttle setting is increased, the MFD and DL mechanisms are reengaged, and the hitch or implement is lowered back to the ground). A reversal of the operation of step 320, the disengaging of the PTO shaft, is not included in FIG. 3 since, typically, the operator of tractor 100 reactivates manually the delivery of power to the hitch or implement at the beginning of each new row (although such an operation could be automatically performed in alternative embodiments).

Similarly, in FIG. 4 a table is provided showing an exemplary sequence of operations to be automatically performed by loader-backhoe 200 (or a similar construction equipment vehicle), while the loader-backhoe is excavating a hole (through the use of boom assembly 220). After beginning the digging process in step 405 (the table presumes that loader-backhoe 200 begins the process with boom assembly 220 in an elevated position above the hole), the boom assembly is lowered into the hole in step 410. Next, in step 415, bucket 250 on boom assembly 220 is retracted towards loader-backhoe 200 so that soil (or other material in the hole) is scooped into the bucket. Further, in steps 420 and 425, boom assembly 220 is raised above the hole and repositioned above a hauling truck (e.g., a dump truck). At this point, loader-backhoe 200 can drop the contents within bucket 250 into the hauling truck (step 430) by extending the bucket such that the open end of the bucket faces the hauling truck. Finally, boom assembly 220 is returned to its initial position located above the hole in step 435, at which point the entire sequence may be repeated (steps 410–435) or, if the excavation of the hole is completed, the digging process may be terminated (step 440).

Each sequence of operations shown in FIGS. 3 and 4 is exemplary and is merely one illustration of a variety of possible automatic operation sequences for an agricultural work vehicle and construction equipment vehicle, respectively. Either sequence could be modified in numerous ways to include additional operations or to exclude or change some of the operations shown. For example, the sequence described in FIG. 3 could be expanded to include the explicit operations of stopping or starting seed or herbicide distribution, or raising or lowering markers, or modified to exclude the automatic steering function. Similarly, the sequence in FIG. 4 could be modified to include operations by loader assembly 210.

Referring to FIG. 5, an exemplary apparatus for terminating the automatic performance of a sequence of operations on a vehicle is shown. As shown, electronic control system 500 is configured in particular for implementation on tractor 100 for terminating a performance of an automatic operation sequence such as that described with respect to FIG. 3. Electronic control system 500 includes communications databus 501, which connects ARU 511, ICU 512, PMU 513, TCU 514, AVCU 515, STCU 516, GOV 517, EDCU 518, and PTO/MFD/DL control unit 519. However, electronic control system 500 could include additional or modified elements, or exclude some of the elements shown in FIG. 5 (particularly for implementation in other agricultural or nonagricultural work vehicles or in connection with the termination of the performances of other automatic operation sequences). For example, electronic control system 500 could be altered for implementation on a construction equipment vehicle such as loader-backhoe 200 as described with respect to FIG. 2. In that case, certain additional control units (and controlled elements) would be added to the control system for loader-backhoe 200, including loader assembly control unit 555 for controlling the positioning of loader assembly 210 and boom assembly control unit 558 for controlling the positioning of boom assembly 220. Also, other control units (and controlled elements) such as EDCU 518 would no longer be necessary insofar as those controllers are tractor-specific. Further, PTO/MFD/DL control unit 519 would be appropriately modified to MFD/DL control unit 559 because loader-backhoe 200 has no PTO shaft. Such a modified version of electronic control system 500 would allow for the termination of an automatic operation sequence such as that described with respect to FIG. 4.

With respect to electronic control system 500 for tractor 100, each of the control units is connected to specific output devices and is capable of performing specific functions in conjunction with its respective output devices (except for ARU 511, which is connected to multiple operator input devices as described below with respect to FIG. 6). Certain of these control units and their respective output devices are directed primarily to providing information to the operator of tractor 100. Specifically, ICU 512 is connected to operator display 522, which may be touch screen 122 (FIG. 1). ICU 512 is capable of receiving data from databus 501 and displaying a variety of information, including information concerning the operational status of elements of electronic control system 500 and other characteristics of tractor 100 that are monitored by the electronic control system, such as vehicle speed or whether the tractor's mechanical front-wheel drive is engaged. In tractor 100, such information also could include information regarding hitch/implement position or whether the tractor's PTO shaft is engaged. (Similarly, in a construction equipment vehicle such as loader-backhoe 200, the displayed information could include information regarding the position of bucket 250.) Further, operator display 522 is capable of providing touch-screen input signals to ICU 512. Analogous to ICU 512 and operator display 522 are, respectively, PMU 513 and performance monitor 523, insofar as the performance monitor is capable of displaying a variety of information to the vehicle operator from the databus as directed by the PMU (as well as capable of providing operator input signals to the PMU).

The control units other than ARU 511, ICU 512 and PMU 513 are directed primarily to controlling the operation of one or more mechanical elements of tractor 100. TCU 514 is connected to transmission 524. Based upon commands received from databus 501, TCU 514 directs transmission 524 to downshift, upshift or maintain a constant gear ratio. TCU 514 may receive feedback signals from transmission 524 and, in addition, may receive input signals from a gear shift lever 524A operated by the vehicle operator. Therefore, TCU 514 also may direct the operation of transmission 524 in response to these signals. AVCU 515 is connected to one or more auxiliary valve(s) 525. Based upon commands received off of databus 501, AVCU 515 directs auxiliary valve(s) 525 to open or close and thereby provide or stop the flow of pressurized hydraulic fluid through the auxiliary valve(s). Multiple elements on tractor 100, as well as multiple elements on a hitch or implement attached to the tractor (such as a tool bar or markers), may be actuated by hydraulic pressure under the control of such hydraulic valves. AVCU 515 may also receive feedback signals from auxiliary valves 525.

Similarly, STCU 516 is connected to steered wheels 526 of tractor 100 (e.g., front wheels 104). Based upon commands received from databus 501, STCU 516 may automatically steer steered wheels 526. Such automatic steering may take place when tractor 100 is driving along a preprogrammed route, which may involve repetitive steering operations. STCU 516 may also receive feedback signals from steered wheels 526, or input signals from a steering wheel 526A. In like fashion, GOV 517 is connected to a throttle 527. Based upon commands received from databus 501, GOV 517 may automatically control the opening and closing of throttle 527 so that, respectively, more or less fuel may be fed to engine 112. GOV 517 may also receive feedback signals from throttle 527.

EDCU 518 is coupled to the actuators of threepoint hitch 151 and controls the positioning of the three-point hitch (and ripper 150 attached to it) based upon commands received from databus 501. The force for positioning these elements may be provided by the hydraulic system (not shown), and so EDCU 518 may control the positioning of these elements by controlling hydraulic valves. In addition to commands from databus 501, EDCU 518 may also respond to signals from a hitch/implement position sensor 528A, (e.g., a potentiometer) which monitors the status (position) of the hitch.

PTO/MFD/DL control unit 519 is connected to and controls three sets of controllable elements. First, PTO/MFD/DL control unit 519 is connected to power take-off (PTO) system 529A and controls engagement or disengagement of the PTO shaft (i.e., whether the shaft rotates and, if it rotates, the speed at which it rotates) based upon commands received from databus 501 as well as feedback signals from the PTO system. Second, PTO/MFD/DL control unit 519 is connected to MFD system 529B and controls engagement or disengagement of the MFD (i.e., controls whether tractor 100 runs with four-wheel or two-wheel drive) based upon commands received from databus 501 as well as feedback signals from the MFD system. Third, PTO/MFD/DL control unit 519 is connected to DL system 529C and controls engagement or disengagement of the DL (i.e., controls whether the differential gear between the drive wheels on an axle of tractor 100 is locked so that those drive wheels turn at the same angular velocity) based upon commands received from databus 501 as well as feedback signals received from the DL system. Whether the MFD or DL are engaged typically depends upon whether hydraulicallyactuated clutches associated with each (not shown) are engaged. Consequently, PTO/MFD/DL control unit 519 may control the MFD or DL by controlling hydraulic valves.

One or more of these control units (ICU 512, PMU 513, TCU 514, AVCU 515, STCU 516, GOV 517, EDCU 518 and PTO/MFD/DL control unit 519) are capable of providing signals to databus 501. These signals may be representative of the operational status of the control units themselves or of elements connected to the control units. (For example, ICU 512 may provide signals onto databus 501 indicative of operator inputs at operator display 522.) In particular, the signals provided onto databus 501 may constitute "flags" indicating that one or more unexpected occurrences or malfunctions have taken place. Specifically, ICU 512 and PMU 513 may provide "flag" signals to databus 501 signifying improper operation on the part of the respective control units themselves or of operator display 522 or performance monitor 523, respectively. TCU 514 may provide "flag" signals to databus 501 upon a transmission control unit malfunction, upon receipt by the TCU of improper or out-of-range signals from gear shift lever 524A, or upon a transmission malfunction such as a failure to shift gears upon command or a sudden drop in transmitted torque or angular velocity. AVCU 515 may provide "flag" signals to databus 501 upon an auxiliary valve control unit malfunction, or upon an auxiliary valve malfunction such as a sudden change in hydraulic pressure delivered through one or more of auxiliary valve(s) 525 despite no change in the actuation of the auxiliary valve(s).

Similarly, STCU 516 may provide "flag" signals to databus 501 upon a steering control unit malfunction, upon receipt by the STCU of improper or out-of-range signals from steering wheel 526A or upon improper turning of steered wheels 526. GOV 517 may provide "flag" signals to databus 501 upon an engine governor control unit malfunction, or upon a malfunction of throttle 527 such as an undulating flow of fuel to engine 112. EDCU 518 may provide "flag" signals to databus 501 upon an electronic draft control unit malfunction, or upon receipt by the EDCU of improper or out-of-range signals from hitch/implement position sensor 528A (including signals from the sensor indicating a malfunction of the hitch such as an uncommanded change in hitch height). PTO/MFD/DL control unit 519 may provide "flag" signals to databus 501 upon a malfunction of that control unit, or upon a malfunction of the PTO, MFD or DL systems such as the sudden, uncommanded engagement of the PTO shaft or the MFD or DL clutches.

As shown in FIG. 5, ARU 511 also is connected to databus 501. Unlike the other control units, ARU 511 only indirectly controls other system elements by providing control signals onto databus 501 (rather than by providing signals directly to the elements via private signal lines connecting the ARU to those elements), which signals may then be received by the other control units. ARU 511 provides control signals to databus 501 based upon signals that it receives from multiple operator input devices 521 (further described in reference to FIG. 6), as well as signals that it receives from the databus. Specifically, ARU 511 is capable of commanding the other control units based upon input signals received from input devices 521, and is also capable of commanding a sequence of operations such as that described above with respect to FIG. 3 (or FIG. 4, assuming a loader-backhoe having an analogous electronic control system).

Referring to FIG. 6, ARU 511 is located within armrest assembly 600. The multiple operator input devices 521 to which ARU 511 is connected are, collectively, mounted for convenient operator access to a console cover 601 of armrest assembly 600. Console cover 601 has two surface portions 602 and 603, and a moveable cover 604 rotates about a hinge 605 to cover surface portion 602 and the operator input devices mounted on that surface portion. Cover 604 prevents accidental movement of the covered input devices, simplifies the interface presented to the operator during normal operation, and provides an armrest for the operator's comfort.

As shown in FIG. 6, operator input devices 521 include, more specifically, a variety of levers, switches and knobs. Among operator input devices 521 are throttle control switch 611, which includes a bump switch 612, valve control levers 613–616, a hitch up/down switch 617, a hitch draft force potentiometer 618, a hitch position control 619, a creeper switch 620, flow limit control knobs 621–625, a kick-out time set knob 626, a drop speed potentiometer 627, an upper limit potentiometer 628, a hitch travel potentiometer 629, a PTO switch 630, an MFD switch 631, a DL switch 632, and a limit switch 633. The high degree of integration of operator input devices 521 on armrest assembly 600 provides a convenient and inexpensive operator interface to the various control systems of tractor 100. However, an operator interface configured differently from armrest assembly 600 could also be used. In particular, interfaces comprising a different set of operator input devices (different either in number or type), interfaces having different surface portions, or multiple interfaces in place of a single interface could be used. Likewise, with respect to vehicles other than tractor 100 such as loader-backhoe 200, a different form of armrest assembly 600 or an entirely different type of operator interface (such as a control panel on the dashboard of the loader-backhoe) might be appropriate.

Electronic control system 500 is capable of terminating an automatic performance of a sequence of operations on tractor 100 as follows. As stated above, armrest unit 511 is capable of commanding the other control units to execute a series of operations (such as those described above with respect to FIG. 3) by providing a series of control signals onto databus 501, which signals are then received by the other control units. The series of control signals may be determined by control programs and information in the form of configuration tables (not shown) stored in memory 532 of ARU 511 (as described with respect to FIG. 1A), and may depend upon signals received by the ARU from operator input devices 521. The configuration table may, for example, store data representative of each sequential step shown in FIG. 3 or FIG. 4.

In addition, the series of control signals also depends upon the signals received by ARU 511 from databus 501. The signals received from databus 501 include signals provided onto the databus by the other control units and, in particular, include operational status or "flag" signals indicating that one or more unexpected occurrences or malfunctions have taken place (such as those described above with reference to FIG. 5). Therefore, in one embodiment, an automatic performance of a sequence of operations would occur under the direction of ARU 511 as it commanded the remaining control units to perform various functions. Then, depending upon the particular programming of ARU 511, the ARU would terminate the automatic performance if the ARU received, via databus 501, specific operational status or "flag" Such "flag" signals may include, for example, Local Error flags, System Disabled flags, System Degraded flags, System Re-enable Required flags, System Configuration/Calibration Required flags, Duplicate Source Address Detected flags and System Configuration Design flags.

While electronic control system 500 is capable of performing automatic operation sequences (e.g., operating in "automatic mode"), the electronic control system also allows for the operator of the tractor to manually control tractor operations (e.g., operating in "manual mode"). The operator may determine whether electronic control system 500 is operating in "manual mode" or "automatic mode" by pressing a mode switch 640 shown on armrest assembly 600 in FIG. 6. In one embodiment, mode switch 640 may be (as shown) a rocker switch that has an "automatic mode" position and a "manual mode" position, but which has no normal position. With such a rocker switch, electronic control system 500 operates in "manual mode" or "automatic mode" completely in dependence on the switch position. In one embodiment of the present invention, performance of an automatic operation sequence while electronic control system 500 is in "automatic mode" commences only upon the occurrence of a triggering event (such that pressing mode switch 640 to the "automatic mode" position enables, but does not activate, the performance of the sequence). The triggering event may be the pressing of another switch by the operator. For example, for a tractor operating in "automatic mode" and having an end-of-row automatic operation sequence as shown in FIG. 3, ARU 511 begins the performance of the end-of-row automatic sequence once the operator presses hitch up/down switch 617 to its UP or RAISE position (to cause the hitch to raise at the end of a row). In alternate embodiments, the triggering event may be the receipt by ARU 511 of a status or other informational signal (e.g., from one of the other control units via databus 501). For example, in one alternate embodiment ARU 511 begins performance of the above-mentioned sequence upon receiving GPS position signals indicating that the tractor has reached the end of a row.

In an alternate embodiment, mode switch 640 may consist of a momentary contact rocker switch having "manual mode" and "automatic mode" positions, where the switch is spring-loaded such that the switch is normally in the "manual mode" position. With such a rocker switch, electronic control system 500 operates in "manual mode" unless the switch is momentarily pressed to the "automatic mode" position, in which case the electronic control system enters "automatic mode" and immediately begins to perform an automatic operation sequence or "macro" (such a switch could be termed a "macro activation switch" or "macro trigger switch"). Upon completion or termination of the automatic operation sequence, electronic control system 500 would immediately return to "manual mode".

In another embodiment, mode switch 640 is designed to allow for additional mode selections by the operator. This is the case particularly if electronic control system 500 is capable of performing more than one automatic operation sequence (in which case, the mode switch may have individual settings corresponding to each automatic operation sequence, e.g., "automatic sequence 1", "sequence 2", etc.).

When electronic control system 500 is operating in "manual mode", the operator may manually command specific functions by way of the various levers, switches and knobs shown on armrest assembly 600 and other operator input devices 521 not shown. ARU 511 may then, in response to input signals from these devices, send control signals along databus 501 to controllers 512–519 (or to other elements connected to the databus). In contrast, once electronic control system 500 has entered "automatic mode" (following the appropriate actuation of mode switch 640), ARU 511 controls the functioning of the elements of the electronic control system automatically, although the automatic control routines performed by the ARU may operate in dependence, at least in part, upon particular inputs from operator input devices 521.

In one embodiment, each operation of the automatic sequence performed by electronic control system 500 (while in "automatic mode") directly results from a specific control signal (or command) provided by ARU 511 to databus 501. That is, each operation performed by tractor 100 only occurs if a related control signal was provided by ARU 511. Therefore, the automatic performance of the sequence of operations terminates once ARU 511 ceases providing additional control signals to databus 501 (as soon as the previously-commanded operations have been completed). Thus, only ARU 511 need be configured specifically for macro operation since the other control units merely execute the commands provided to them by ARU 511.

In another embodiment, ARU 511 provides only "start" or "stop" macro control signals onto databus 501 and the other control units direct the performance of the automatic operation sequence based upon control programs or other information within their respective memories 532. Coordination between these other control units in performing the various operations occurs largely in a "peer-to-peer" fashion whereby each control unit is capable of modifying the performance of its particular operations in response to signals provided on databus 501. In this embodiment, termination of the automatic operation sequence (once it has begun) does not occur merely because ARU 511 fails to provide specific control signals onto databus 501 (since the control units other than ARU 511 continue to execute the automatic operation sequence without further direction from the ARU). Rather, for termination to occur, ARU 511 must actively provide a specific "stop" macro signal onto databus 501.

Insofar as the control units other than ARU 511 are capable of providing a wide variety of operational status or "flag" signals (indicating numerous operational status conditions or system malfunctions), electronic control system 500 is capable of terminating the performance of an automatic sequence of operations (such as that of FIG. 3) in response to a multitude of different conditions. In one embodiment, the various "flag" signals are essentially identical when provided to databus 501, and ARU 511 does not respond to one "flag" in a substantially different manner than it responds to any other "flag". This interchangeability of "flag" signals renders electronic control system 500 highly adaptable to include additional control units (or other system elements), since ARU 511 is capable of terminating automatic operation sequences in response to new system conditions without being reprogrammed.

An exemplary condition in which electronic control system 500 terminates the performance of the automatic operation sequence shown in FIG. 3 is as follows. As described above, the automatic operation sequence to be performed by tractor 100 at the end of a row includes the step of raising the hitch or implement (step 310). As the hitch (or implement) is raised, hitch/implement position sensor 528A normally provides a signal that indicates whether the hitch has been raised above a particular level and attained a "hitch-up" position. In addition, EDCU 518 may be programmed to verify that hitch/implement position sensor 528A is providing the "hitch-up" position signal within a particular time period (the "expected time") after the EDCU commanded the hitch to raise.

It is possible that, in any one of a number of circumstances, hitch/implement position sensor 528A may not provide the "hitch-up" position signal within the "expected time" of EDCU 518. First, it is possible that the hitch may not raise when commanded to do so by EDCU 518. This may occur because of a failure on the part of the hydraulic system of tractor 100 to provide hydraulic power to lift the hitch. Also, it may occur if the hitch accumulates a foreign object as tractor 100 proceeds through the field and the foreign object prevents the hitch from raising (for example, because the hitch is now too heavy for the hydraulic system to lift it, or because EDCU 518 is programmed to stop lifting the hitch if the hitch weight exceeds a maximum amount, in order to prevent wear and tear to the hitch or the tractor). Second, it is possible that hitch/implement position sensor 528A may provide an erroneous signal (indicating that the hitch remains in a "hitch-down" position even though it has entered the "hitch-up" position), either because of a failure on the part of the sensor electronics or because a foreign object accumulated by tractor 100 prevents the sensor from properly measuring the position of the hitch.

Under any of these circumstances, the failure of hitch/implement position sensor 528A to provide the "hitch-up" position signal would constitute grounds for terminating the performance of the automatic operation sequence. It would not be appropriate for tractor 100 to continue the automatic sequence of operations at the end of the row if the hitch was, in fact, in a "hitch-down" position for the reasons described above. Additionally, it would not be appropriate for tractor 100 to continue the automatic sequence of operations if hitch/implement position sensor 528A was malfunctioning, insofar as information regarding hitch position from the hitch/implement position sensor may be relayed by EDCU 518 to databus 501 and, in turn, used by various control units to determine their own operation. For example, GOV 517 may generally be configured to set throttle 527 to a higher setting when the hitch is in the "hitch-down" position than when the hitch is in the "hitch-up" position, since a higher throttle setting may be necessary for tractor 100 to overcome the drag of the hitch as it encounters the ground. Consequently, if hitch/implement position sensor 528A erroneously provides a signal indicating that the hitch is in the "hitch-down" position when the hitch is actually in the "hitch-up" position, GOV 517 may set throttle 527 to a higher setting than is appropriate.

For these reasons, EDCU 518 is configured to provide a "flag" signal to databus 501 if it does not receive a signal from hitch/implement position sensor 528A indicating that the hitch has entered the "hitch-up" position within the expected time. Further, ARU 511 is configured to terminate the performance of the automatic operation sequence described with respect to FIG. 3 upon the receipt of such a "flag" signal. Thus, electronic control system 500 is capable of terminating the performance of the automatic operation sequence shown in FIG. 3 upon a failure of EDCU 518 to receive a "hitch-up" signal from hitch/implement position sensor 528A within the expected time.

An exemplary condition also can be described in which an analogous electronic control system for loader-backhoe 200 terminates the performance of the automatic operation sequence shown in FIG. 4. With respect to that sequence of operations, loader-backhoe 200 is required to repeatedly move elements of boom assembly 220. Such movement requires force that is provided by a hydraulic system, which in turn requires power to be provided from engine 209 of loader-backhoe 200. Given such an interrelationship between engine 209 and the performance of the sequence of operations, it would be appropriate to terminate the automatic operation sequence upon engine failure. This can be achieved by (a) configuring engine governor control unit 557 to monitor feedback signals from throttle 558B and, upon receiving a signal from the throttle indicating a failure, to provide a "flag" signal onto the databus for receipt by armrest unit 551, and (b) configuring the armrest unit to cease providing commands upon receiving the "flag" signal indicating engine failure.

In the above description, electronic control system 500 has been described as having the capability of terminating an automatic operation sequence once it has begun, in response to the specific operational status or "flag" signals (which may occur before or during the performance of the automatic operation sequence). However, alternate embodiments of the present invention have the capability of preventing or inhibiting the commencement of an automatic operation sequence in response to one or more of these "flag" signals. For example, as described above, ARU 511 may enter "automatic mode" upon the pressing of mode switch 640 but be programmed not to commence a given automatic operation sequence until another triggering event occurs. ARU 511 may also thus be programmed not to commence even upon the occurrence of the specified triggering event if it also has received one or more of the "flag" signals. (In alternate embodiments where mode switch 640 has a "manual mode" normal position as described above, and where toggling of the mode switch to the "automatic mode" position results in the immediate commencement of an automatic operation sequence, ARU 511 may be programmed to ignore the toggling of mode switch 640 to the "automatic mode" position when it has received one of the "flag" signals.) Designing electronic control system 500 so that the system may entirely prevent the commencement of an automatic operation sequence in response to "flag" signals is of significance insofar as, in certain circumstances, there may be little value in partly performing an automatic operation sequence and then having to stop the performance before its completion.

Although only a few exemplary embodiments of this invention have been described above, those skilled in the art will readily appreciate that many modifications are possible in the exemplary embodiments without materially departing from the novel teachings and advantages of this invention. As is readily indicated, the invention can be employed in a variety of work vehicles that automatically perform sequences of operations. Further, the number and types of operator input elements, control elements, sensor elements, output elements and communication links between elements may vary insofar as they continue to accomplish functions related to the performing of automatic operation sequences and the termination of such sequences. Accordingly, all such modifications are intended to be included within the scope of the invention as defined in the following claims. Other substitutions, modifications, changes and omissions may be made in the design, operating conditions and arrangement of preferred and alternative embodiments without departing from the spirit of the invention as expressed in the appended claims.

What is claimed is:

1. A system for performing an automatic sequence of operations of a work vehicle, the system comprising:
   a databus;
   a plurality of input devices;
   a primary control unit coupled to the plurality of input devices and to the databus, the primary control unit configured to direct the performance of the automatic sequence of operations by generating commands to be provided onto the databus;

a plurality of output devices; and a plurality of secondary control units coupled to the databus, each of the secondary control units also coupled to at least one of the output devices, each of the secondary control units configured to direct an output function by the at least one output device coupled thereto in response to the commands on the databus, wherein at least one of the secondary control units is further configured to provide a status signal onto the databus indicative of a status of the at least one of the secondary control units or the respective output device, and wherein the primary control unit prevents the performance of the automatic sequence of operations if the status signal is indicative of a system malfunction.

2. The system of claim 1, wherein the primary control unit terminates the performance of the automatic sequence of operations after the sequence has already begun, if the status signal is indicative of a system malfunction.

3. The system of claim 1, wherein the primary control unit inhibits the performance of the automatic sequence of operations, if the status signal is indicative of a system malfunction.

4. The system of claim 1, wherein the secondary control units are further configured to direct the plurality of output functions by the output devices in response to feedback signals from the output devices.

5. The system of claim 1, wherein the databus is a CAN databus.

6. The system of claim 1, wherein a first of the secondary control units is a transmission control unit and a first of the output devices is a transmission coupled to the transmission control unit.

7. The system of claim 1, wherein a first of the secondary control units is an engine governor control unit and a first of the output devices is a throttle coupled to the engine governor control unit.

8. The system of claim 1, wherein a first of the secondary control units is a steering control unit and a first of the output devices is a pair of steered wheels coupled to the steering control unit.

9. The system of claim 1, wherein a first of the secondary control units is a PTO/MFD/DL control unit and a first of the output devices is a PTO shaft, a second of the output devices is a MFD system and a third of the output devices is a DL system.

10. The system of claim 1, wherein the primary control unit prevents the performance of the automatic sequence of operations by not providing new commands for the automatic sequence onto the databus.

11. The system of claim 1, wherein the primary control unit prevents the performance of the automatic sequence of operations by providing a stop command onto the databus.

12. The system of claim 1, wherein the work vehicle is an agricultural work vehicle.

13. The system of claim 1, wherein the work vehicle is a construction equipment vehicle.

14. The system of claim 1, wherein the primary control unit includes a memory device that stores macro data indicative of the automatic sequence of operations.

15. The system of claim 1, further comprising a trigger switch wherein the system only performs the automatic sequence of operations when the trigger switch is actuated.

16. A method of performing an automatic sequence of operations of a work vehicle, the method comprising the steps of:

at a primary control unit coupled to a databus:
    providing commands onto the databus to direct the performance of the automatic sequence of operations;

at a secondary control unit coupled to the databus:
    directing an output function by an output device in response to the commands on the databus; and
    providing a status signal onto the databus indicative of a status of a system element; and at the primary control unit:
    preventing the performance of the automatic sequence of operations if the status signal is indicative of a system malfunction.

17. The method of claim 16, wherein the directing of the output function is also in response to a feedback signal from the output device.

18. The method of claim 16, wherein the databus is a CAN databus.

19. The method of claim 16, wherein the secondary control unit is a PTO/MFD/DL control unit and the output device is a PTO shaft, further comprising a second output device that is a MFD system and a third output device that is a DL system, wherein the secondary control unit also directs a second output function by the second output device and a third output function by the third output device in response to the commands on the databus.

20. The method of claim 16, wherein the preventing of the performance of the automatic sequence of operations occurs because the primary control unit does not provide new commands for the automatic sequence onto the databus.

21. The method of claim 16, wherein the preventing of the performance of the automatic sequence of operations occurs because the primary control unit provides a stop command onto the databus.

22. The method of claim 16, wherein the work vehicle is an agricultural work vehicle.

23. The method of claim 16, wherein the work vehicle is a construction equipment vehicle.

24. A system for performing an automatic sequence of operations of a work vehicle, the system comprising:

a communication means for carrying signals;

an input means for receiving operator inputs;

a primary control means coupled to the input means and to the communication means for generating commands to be provided on the communication means and thereby directing the performance of the automatic sequence of operations;

a plurality of output devices;

a secondary control means coupled to the plurality of output devices and to the communication means for directing a plurality of output functions by the output devices in response to the commands on the communication means, wherein the secondary control means is configured to provide a status signal onto the communication means indicative of a status of at least one of the output devices or the secondary control means, and wherein the primary control means prevents the performance of the automatic sequence of operations if the status signal is indicative of a system malfunction.

* * * * *